(12) United States Patent
Boudreau (10) Patent No.: US 7,610,699 B2
(45) Date of Patent: Nov. 3, 2009

(54) ASSEMBLY FOR HARVESTING SHELLFISH SUCH AS SCALLOPS AND ALIKE

(76) Inventor: Marcel Gerard Boudreau, P.O. Box 141, 70 Celtic Drive, St. Andrews, N.S. (CA) B0H 1X0

( * ) Notice: Subject to any disclaimer, the term of this patent is extended or adjusted under 35 U.S.C. 154(b) by 0 days.

(21) Appl. No.: 12/221,408

(22) Filed: Aug. 4, 2008

(65) Prior Publication Data

US 2008/0295365 A1    Dec. 4, 2008

(51) Int. Cl.
*A01K 73/00* (2006.01)
(52) U.S. Cl. .............................. 37/315; 37/314; 43/9.4; 43/9.7; 56/8; 56/9
(58) Field of Classification Search .................... 37/315, 37/316, 341, 314; 43/9.4, 9.7; 56/8, 9
See application file for complete search history.

(56) References Cited

U.S. PATENT DOCUMENTS

| | | | | |
|---|---|---|---|---|
| 2,508,087 A | * | 5/1950 | Bailey | 37/315 |
| 3,608,217 A | * | 9/1971 | Voisin, Sr. | 37/316 |
| 4,185,404 A | * | 1/1980 | Hue et al. | 37/314 |
| 4,646,448 A | * | 3/1987 | Voisin | 37/316 |
| 4,759,146 A | * | 7/1988 | Le Beon et al. | 43/4.5 |
| 4,813,377 A | * | 3/1989 | Riche | 37/316 |
| 5,024,009 A | * | 6/1991 | Kirkman | 37/316 |
| 6,953,528 B2 | * | 10/2005 | Nesfield | 210/747 |
| 2006/0236950 A1 | * | 10/2006 | Patrick et al. | 119/219 |

* cited by examiner

*Primary Examiner*—Thomas A Beach
*Assistant Examiner*—Matthew R Buck
(74) *Attorney, Agent, or Firm*—Frederick Kaufman

(57) ABSTRACT

The assembly comprises a frame-truss subassembly, to which are attached an internal subassembly for directing a flow of encountered water during dragging and a subassembly for collecting and discharging shellfish. An external subassembly is used for encasing the frame-truss subassembly together with the internal subassembly and the subassembly for collecting and discharging shellfish. The frame-truss subassembly includes a pair of lateral trusses, spaced at a distance commensurable with a width of the assembly. The internal subassembly includes an anterior panel with a forwards oriented concavity and a posterior panel with a backwards oriented concavity. The subassembly for collecting and discharging, disposed behind the internal subassembly includes a louver platform, a grid receptacle supported by the platform and a mechanism for topple over the grid receptacle. At least two sets of a multiplicity of hinged flaps are used.

1 Claim, 13 Drawing Sheets

SECTION XI-XI

ASSEMBLY FOR HARVESTING SHELLFISH SUCH AS SCALLOPS AND ALIKE

I. BACKGROUND OF THE INVENTION

1. Definition of the Invention

The present invention refers, in general, to apparatuses for harvesting shellfish and, more particularly, to an assembly for harvesting shellfish such as scallops and alike.

2. Description of the State of Art

As a rule, shellfish living on or in the sea bottom are harvested with the aid of draggers or the like which are dragged along the sea bottom. Such draggers or the like are provided with tines or knives reaching into the bottom, such that the tines or knives are pulled through the sea bottom. A jet of water is directed to the sea bottom, so that the soil of the sea bottom is stirred up and raised. As a result, a quantity of shellfish is disengaged. Behind the tines or the knives, in the dragger, a collecting basket is located in which the shellfish is caught, while mud, sand, sediment, undersized shellfish and the like can flow back through the basket. As a result of the water injection and the direction of the latter, a relatively large mass of sediment is flushed from the bottom. The fact that as a result of on the one hand, the pulling force applied to the dragger and, on the other hand, the force of the water jet directed approximately vertically during the harvesting operation, a buoyant force is applied to the dragger which must be compensated by the weight of the dragger.

Thus, one can conclude, that the known methods of harvesting shellfish suffer the problem of severely disturbing or destroying the shellfish beds. Such destruction of shellfish beds limits the ability of the latter to regenerate themselves, thus reducing the quantity of shellfish available for harvesting in the future.

Various attempts have been made to solve or at least to mitigate the negative aspects of the existing shellfish harvesting. Some attempts can be exemplified in the following prior art references: U.S. Patent Application Publication No. 2006/0037550 to May et al. published Feb. 23, 2006 with the title "Apparatus and method of harvesting shellfish" describes an assembly comprising a boom positioned with one end over the deck of the boat and attached with another end to a turret, and a gathering device. The latter has a rake with a plurality of spaced apart prongs to entrap shellfish. The rake contains also a spray bar with a plurality of spray ports. A hydraulic cylinder is mounted on the boom, while another hydraulic cylinder is mounted to a gathering arm. The foregoing apparatus has several important disadvantages, among which are: the depth of harvesting is limited by the length of the gathering arm and the use of hydraulic cylinders renders the apparatus relatively expensive and less reliable. Another example is: U.S. Pat. No. 5,027,533 to Holt et al. issued Jul. 2, 1991 for a "Vibratory shellfish harvesters and methods". Basically, a Holt's harvester includes a sledge having a pair of runners designated to slide over the submarine surface of a shellfish growing substrate and a plurality of tines extending downward from the sledge for penetration into the substrate. A vibratory device is used to impart a vibratory motion to those tines, in a substantially normal direction to to the submarine surface. The vibratory device includes a rotatable, off-center mass and a hydraulic motor for rotating the mass; a shock absorber device is used to reduce vibration of the runners by the vibratory device. The solution described in this patent is an example of substrate disturbance by the plurality of tines. Moreover, the use of a vibratory device negatively affects the submarine interface between bottom sediment and the water just above it, which is a very important region of submarine water.

II. SUMMARY OF THE INVENTION

Based on the above presentation, it will become apparent that the forthcoming objectives of the present invention are not accomplished by presently available apparatuses.

Accordingly, a basic objective of the present invention is to design an assembly which minimize undesirable habitat damage by reducing the disruption of the beds in which remaining shellfish continue to grow.

Another important objective is to obtain dynamic fluid forces able to extract shellfish and divert it into a subassembly for collecting and discharging.

Broadly stating the assembly for harvesting shellfish such as scallops and alike, according to the present invention, comprises a frame-enclosure truss subassembly to which are attached
an internal subassembly for directing a flow of encountered water during a dragging
operation of the assembly for harvesting shellfish;
a subassembly for collecting and discharging harvested shellfish; and an external subassembly for encasing the frame-enclosure truss subassembly together with
the internal subassembly for directing a flow of encounter water during a dragging.

The frame-enclosure truss subassembly includes a pair of lateral trusses extending longitudinally and spaced at a distance commensurable with a working width of the assembly for harvesting shellfish.

The internal subassembly for directing a flow of encountered water during a dragging operation includes an anterior, curved panel having its concavity forwards oriented and a posterior, curved panel having its concavity backwards oriented. The anterior and posterior curved panels are flanked by the pair of lateral trusses.

The subassembly for collecting and discharging harvested shellfish, disposed behind the internal subassembly for directing a flow of encountered water during a dragging operation, includes a louver type grille-platform, a metal grid receptacle supported by the louver type grille-platform and a mechanism for topple over the metal grid receptacle when loaded with shellfish.

At least a pair of sets of a multiplicity of hinged flexible flaps is used, a first, front one being attached to a lowest part of the internal subassembly for directing a flow of encountered water during a dragging operation, where the anterior and posterior curved panels meet, while a second multiplicity of hinged flexible flaps is attached at a frontal part of the louver type grille-platform.

III. BRIEF DESCRIPTION OF THE DRAWINGS

Although the characteristic features of the invention will be particularly pointed out in the claims, the invention itself and the manner in which it may be made and used may be better understood by referring to the following description and accompanying drawings, where like reference numerals refer to like parts throughout the several views of the drawings, in which:

IV. DESCRIPTION OF THE PREFERRED EMBODIMENT

The accompanying drawings, as above described, illustrate a preferred embodiment of an assembly for harvesting shellfish such as scallops and alike, generally referenced as 10. For convenience, in the following disclosure, the foregoing assembly will be named "assembly 10". As a caveat, it is to be agreed, that terms, such as "top", "bottom", "front", "back", "vertical", "horizontal", "upward", "downward" and "outward" are conventionally employed in the present specification with reference to the normal position in which assembly 10 will be used.

Broadly describing, with reference to FIGS. 1 through 5, assembly 10 comprises a frame-enclosure truss subassembly 100, to which are attached other subassemblies which compose assembly 10, namely:

- an internal subassembly 200 for directing a flow of encountered water during a dragging of assembly 10, when the latter is immersed; and
- a subassembly 300 for collecting and discharging harvested shellfish; and
- an external subassembly 400 for encasing frame-enclosure truss subassembly 100 together with internal subassembly 200 and subassembly 300 for collecting and discharging harvested shellfish.

Figure 1:
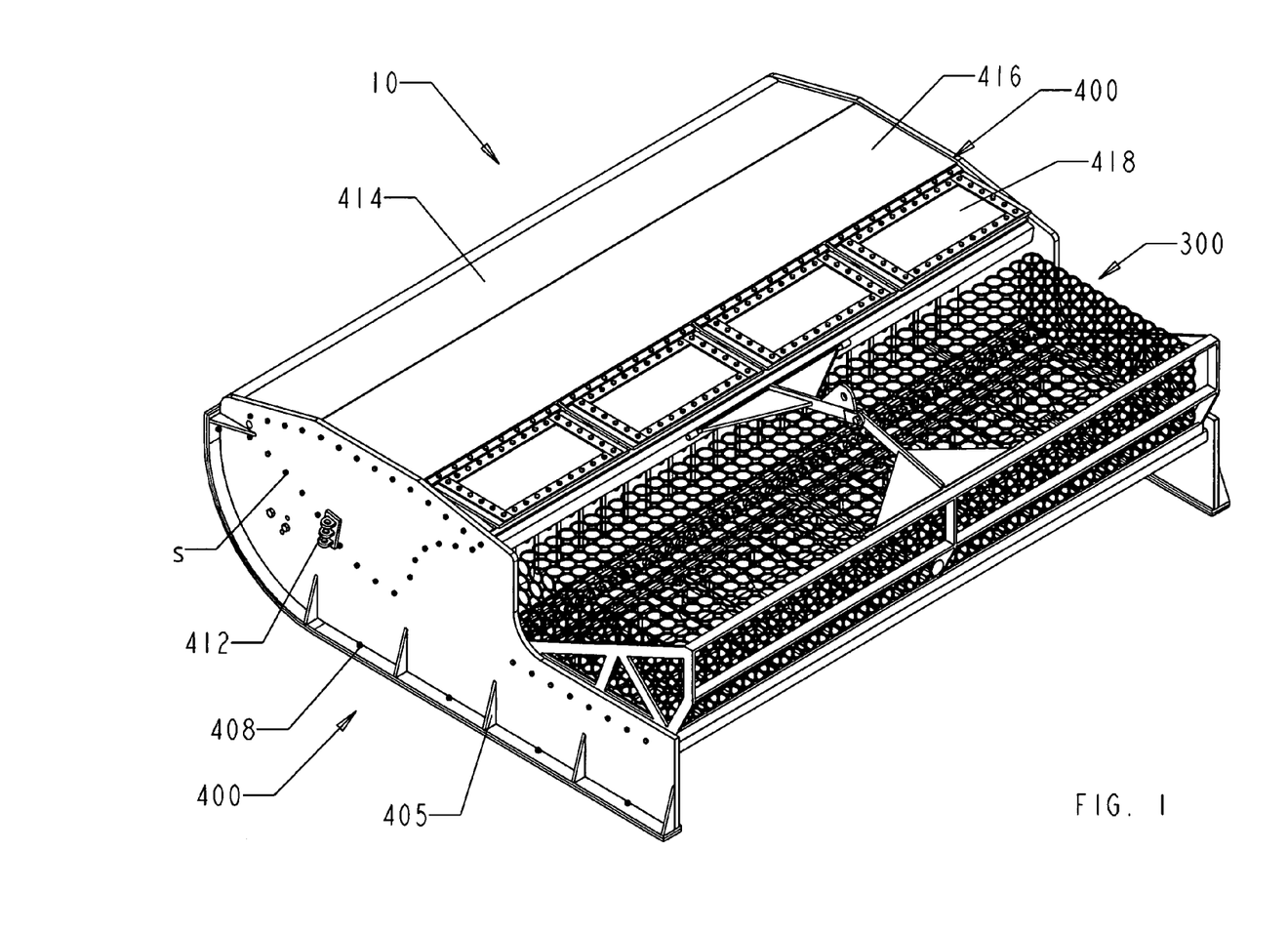
FIG. 1 is a perspective view of the assembly for harvesting shellfish such as scallops and alike.
Figure 2:
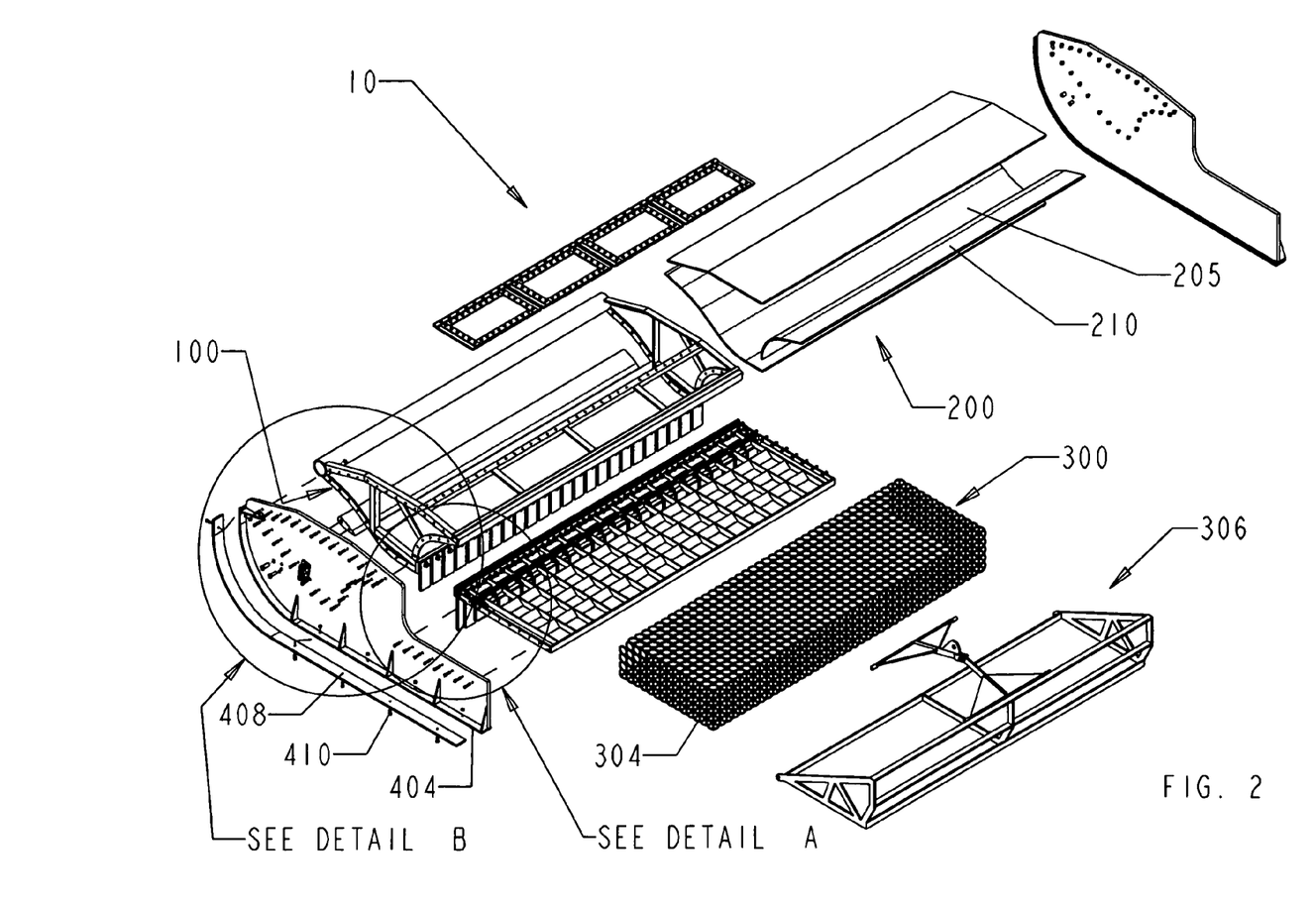
FIG. 2 shows an exploded view of the assembly depicted in FIG. 1.
Figure 3:
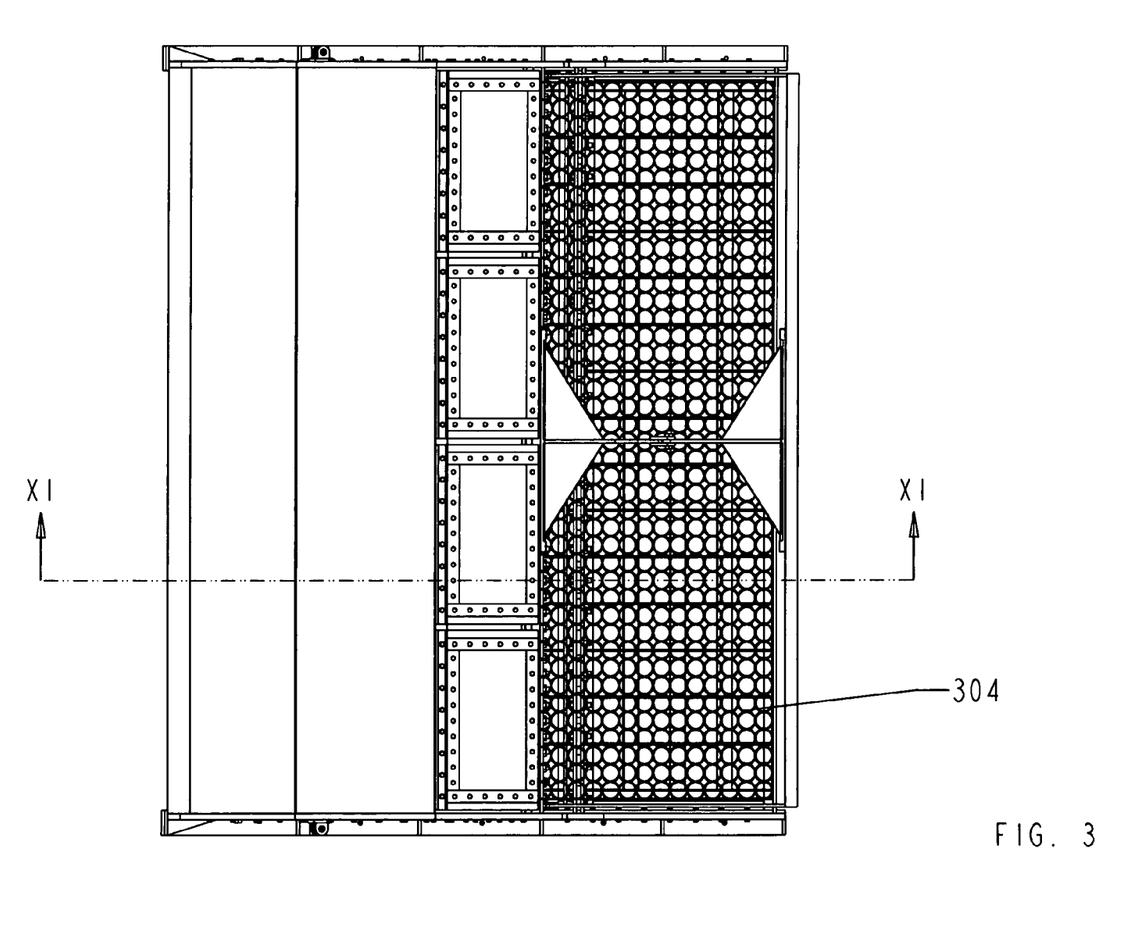
FIG. 3 is a top plan view of the assembly depicted in FIG. 1.
Figure 4:
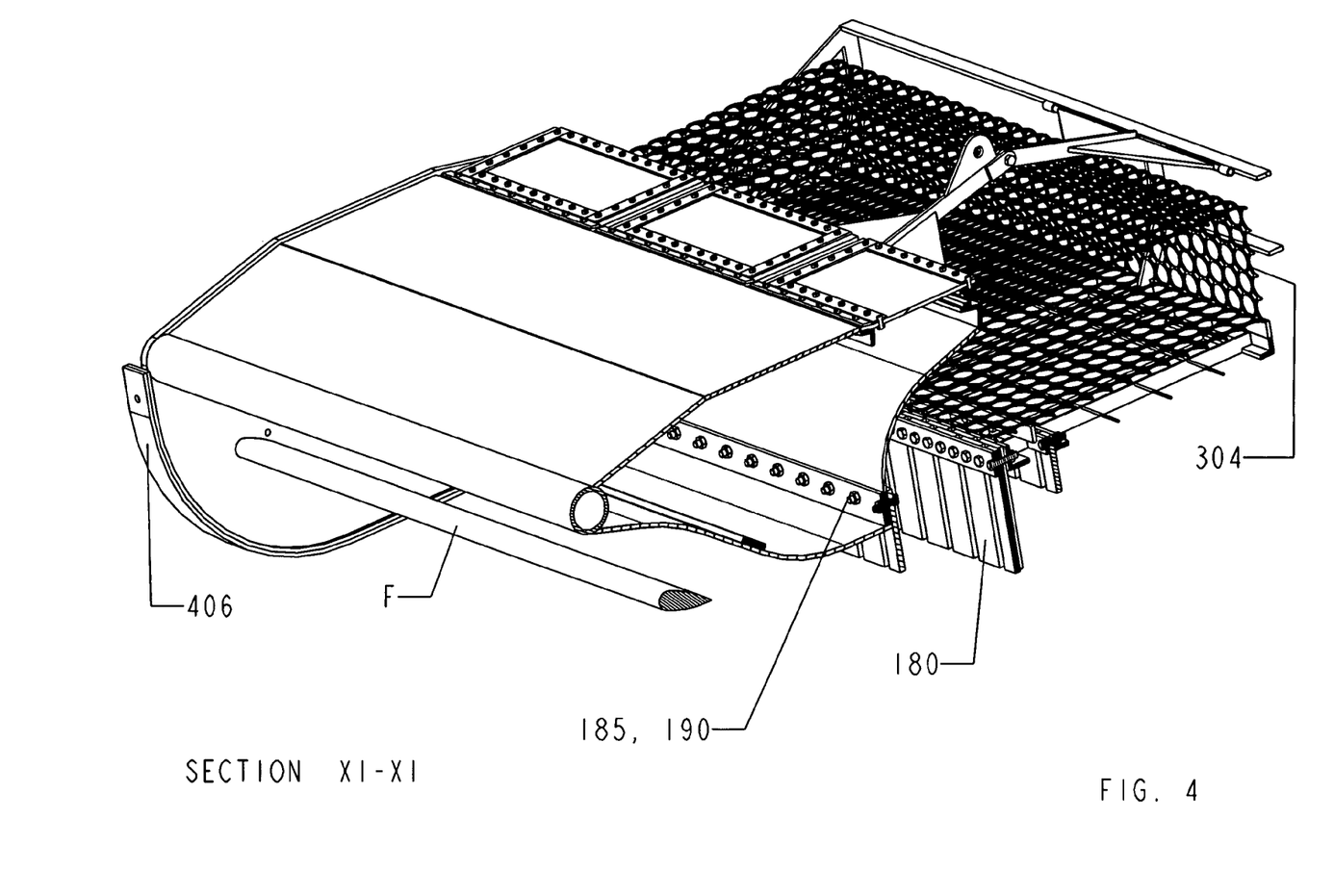
FIG. 4 is a longitudinal cross section taken along line X1-X1, depicted in perspective, of FIG. 3.
Figure 5:
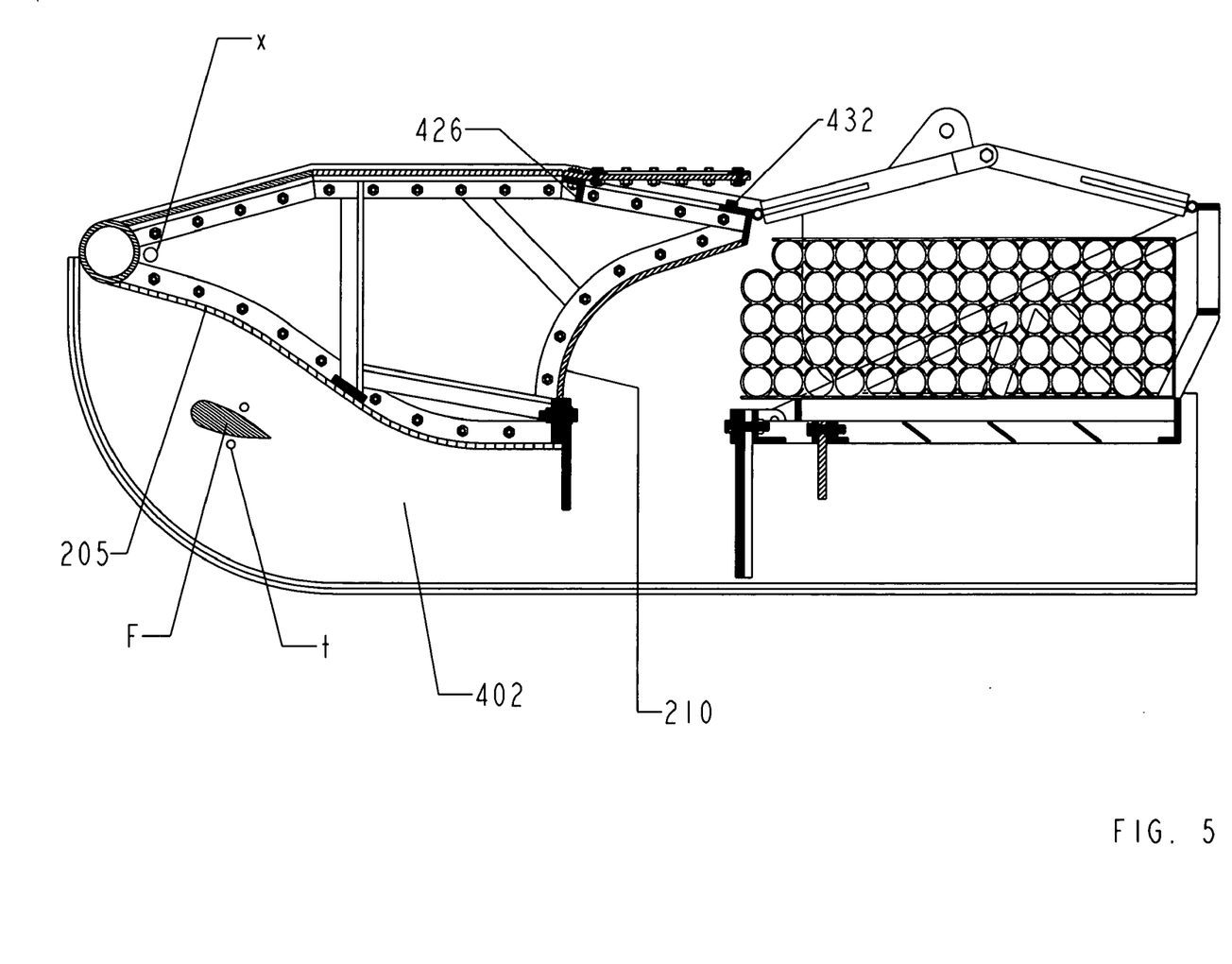
FIG. 5 is a longitudinal cross section taken along line X1-X1 of FIG. 3.
Figure 6:
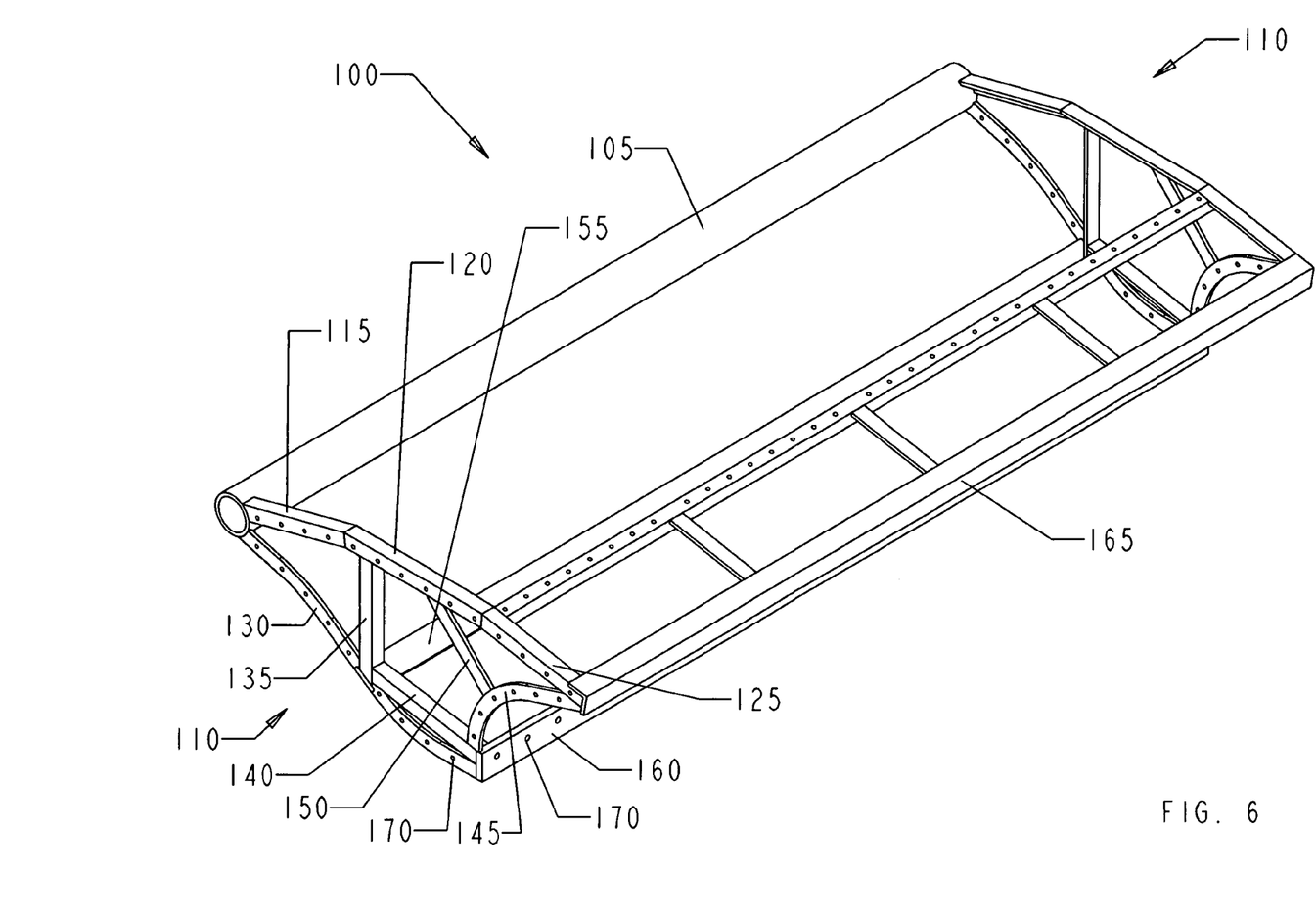
FIG. 6 is a perspective view of a frame-enclosure truss subassembly.
Figure 7:
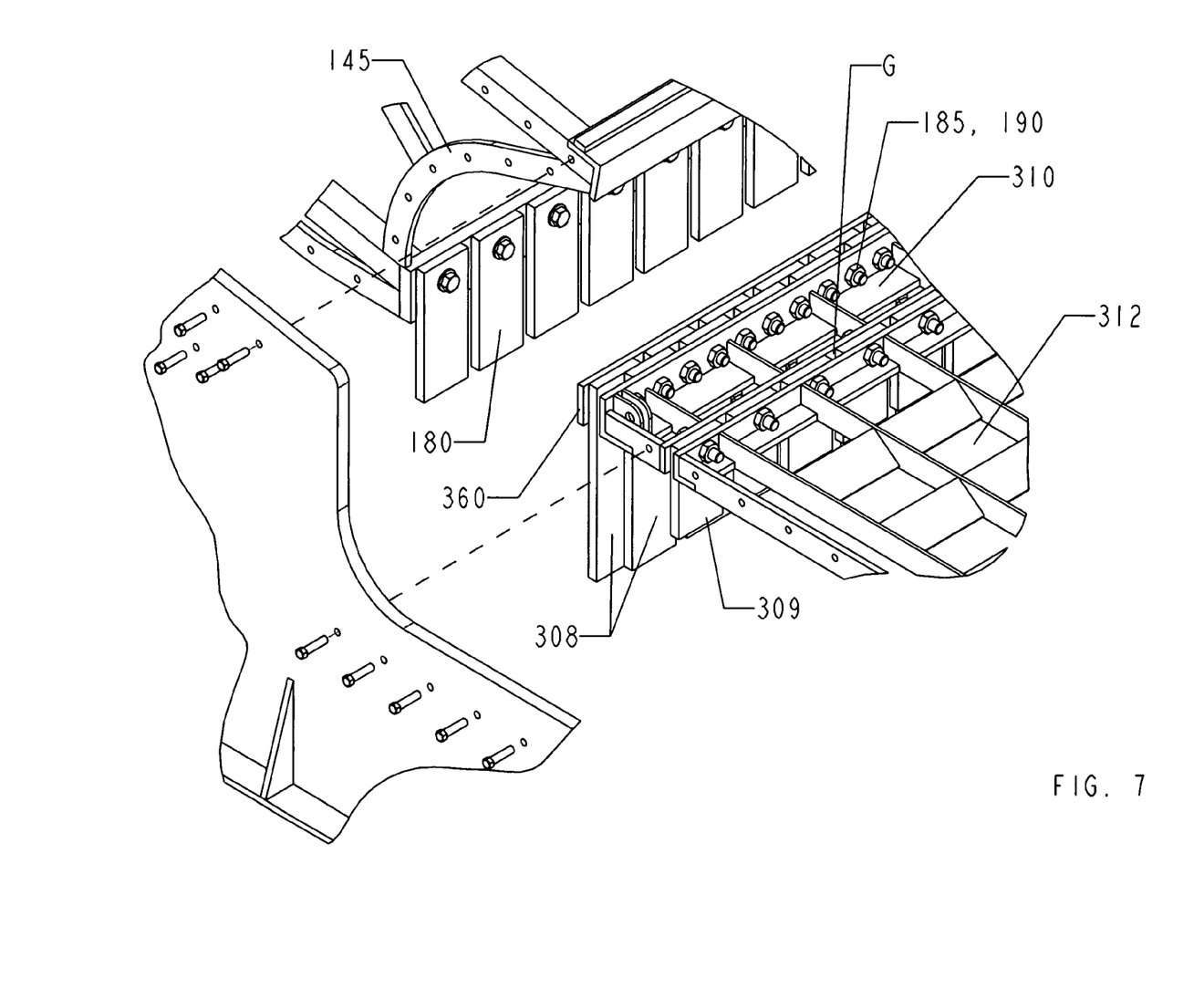
FIG. 7 is an enlarged fragmentary perspective view of "DETAIL A" depicted in FIG. 2.

Describing now in detail, frame-enclosure truss subassembly 100 (see FIG. 6), which is a space truss of welding design, includes:

- a tubular member 105 frontally located and transversally extending with respect to assembly 10; tubular member 105 has a length generally commensurable with a working width of the aforementioned assembly 10;
- a pair of lateral trusses 110 extending backward from tubular member 105, namely from longitudinal extremities of the latter; each lateral truss 110 is made of standard L-section beams and incorporates an inclined upper truss member 115 starting from tubular member 105, to which it is permanently secured, and extending upwardly; an intermediary upper truss member 120 forms a butt joint with inclined upper truss member 115 and extends backward, slightly deviating upwardly from the horizontal direction; an upper end truss member 125, which after forming a butt joint with intermediary upper truss member 120 extends backward, slightly deviating downwardly from the horizontal direction;

each lateral truss 110 further incorporates a lower truss member 130, characterized by a contour similar to a longitudinally stretched S, which starts from tubular member 105, to which it is permanently secured, and extends backward and downwards; lower truss member 130 has a length, when projected on a horizontal plane, generally similar to compounded lengths, when projected on a horizontal plane, of inclined upper truss member 115 and intermediary upper truss member 120;

each lateral truss 110 yet further includes: a) a vertical strut 135 which starts from intermediary upper truss member 120, more precisely, starts in proximity of the zone where intermediary upper truss member 120 forms a butt joint with inclined upper truss member 115, and joins lower truss member 130; b) an inclined strut 140 which extends from a bottom of vertical strut 135 and ends, after contacting an upper end of lower truss member 130, in a vertical imaginary plan which passes through an end surface of lower truss member 130; and c) a connecting truss member 145 which joins a lower terminal zone of upper end truss member 125 and an upper terminal zone of lower truss member 130;

connecting truss member 145 has a profile similar to an arc of a circle subtending an angle somewhat more than 90°; a top segment of connecting truss member 145 departs upwards from its normal circular contour;

finally, each lateral truss 110 is also provided with a diagonal type strut 150 which generally joins a middle zone of intermediary upper truss member 120 with a middle zone of connecting truss member 145;

in order to secure a spatial rigidity of frame-enclosure truss subassembly 100, the pair of lateral trusses 110 are interconnected as follows:

by 1) aforementioned tubular member 105;

2) a first flat bar 155 so joining the underneaths of vertical struts 135 as to coincide with a segment of a lower external contour of lower truss member 130;

3) a second flat bar 160 joining inclined strut 140 with lower truss member 130 in a zone where inclined strut 140, after contacting an upper end of lower truss member 130, ends in a vertical imaginary plane which passes through an end surface of lower truss member 130;

4) an inversed L-beam 165 which captures and joins connecting truss member 145, respectively its upper part, and lower terminal zone of upper end truss member 125, where the former and the latter form a junction.

Inclined upper truss member 115, intermediary upper truss member 120, upper end truss member 125, lower truss member 130 and connecting truss member 145, all made of standard L-section beams, have all their laterally oriented legs traversed along their length by a plurality of equally spaced apertures 170 whose use will be described further in this disclosure; second flat bar 160 is longitudinally provided with equally spaced openings 175 and their use will be explained in the forthcoming disclosure.

A first set of a multiplicity of hinged flexible flaps 180, made of rubber or equivalent materials, is secured along second flat bar 160 via conventional fasteners such as bolts 185 inserted into equally spaced openings 175 and tightened by nuts 190.

Internal subassembly 200 includes basically an anterior, curved panel 205 with its concavity forwards oriented, followed by a posterior, curved panel 210 with its concavity backwards oriented.

Anterior, curved panel 205 starts from tubular member 105 to which it is secured, then extends downwards and backwards, being continuously superimposed on and secured to:

lower truss member 130, respectively its lower external surface;

bottom of first flat bar 155; and bottom of second flat bar 160.

Posterior, curved panel 210 is so profiled as to coincide with connecting truss member 145, on which is superposed and to which is attached.

Subassembly 300 adapted for collecting and discharging harvested shellfish, such as scallop and alike includes:

A) a louver type grille-platform 302;

B) a metal grid receptacle 304 supported by louver type grille-platform 302;

C) a mechanism for topple over 306 a loaded metal grid receptacle 304; and D) a second and a third set of a multiplicity of hinged flexible flaps, respectively 308 and 309, secured to louver type grille-platform 302.

Louver type grille-platform 302 (see FIGS. 8 and 9) is spaced behind a lower part of curved panel 210 and incorporates a first grille section 310, followed by a second grille section 312, both being horizontally positioned and having the same width, generally commensurate with the working width of assembly 10. A gap G is provided between first and second grille sections 310 and 312.

Figure 8:
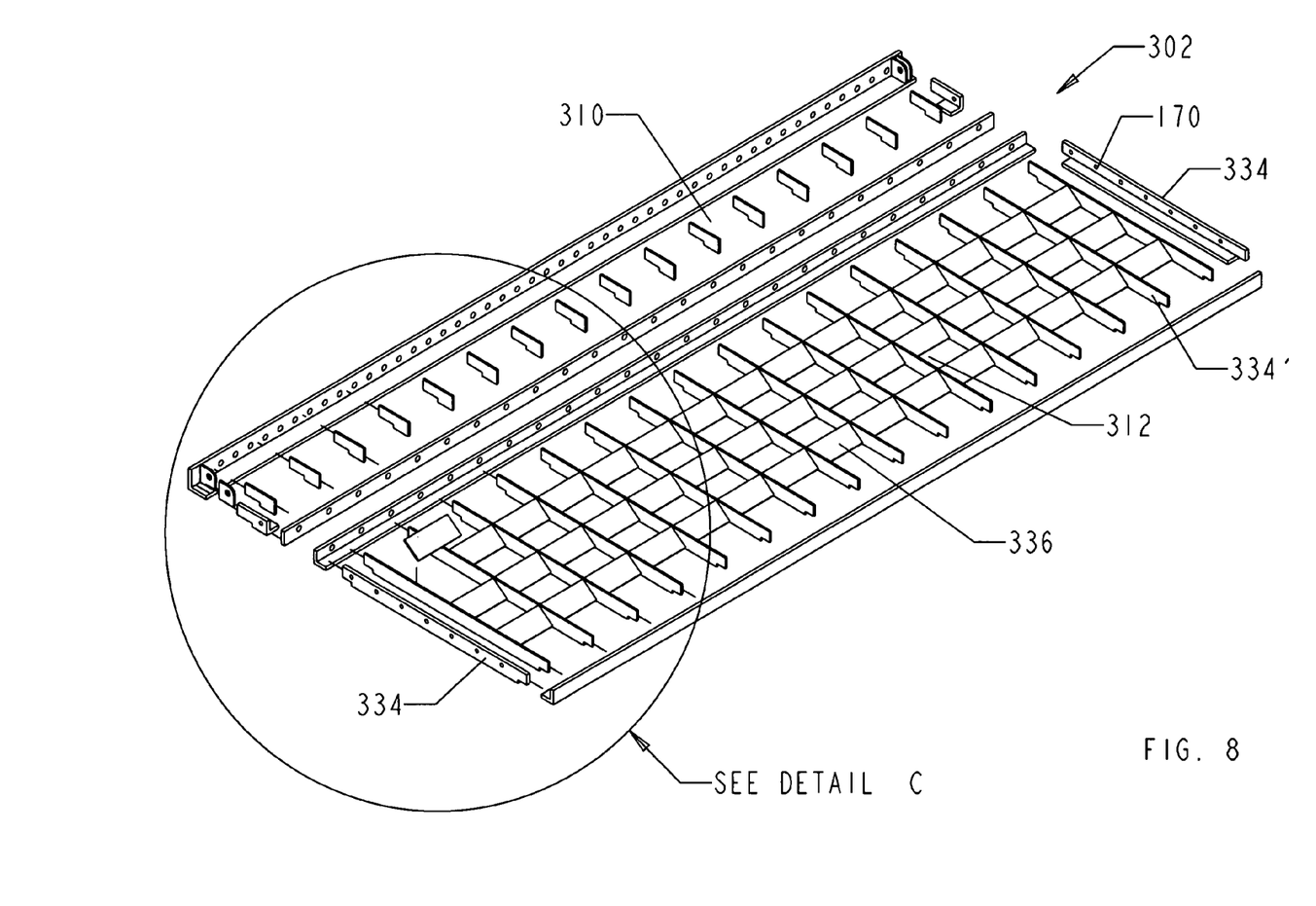
FIG. 8 is an exploded view of a louver type grille-platform according to the present invention.
Figure 9:
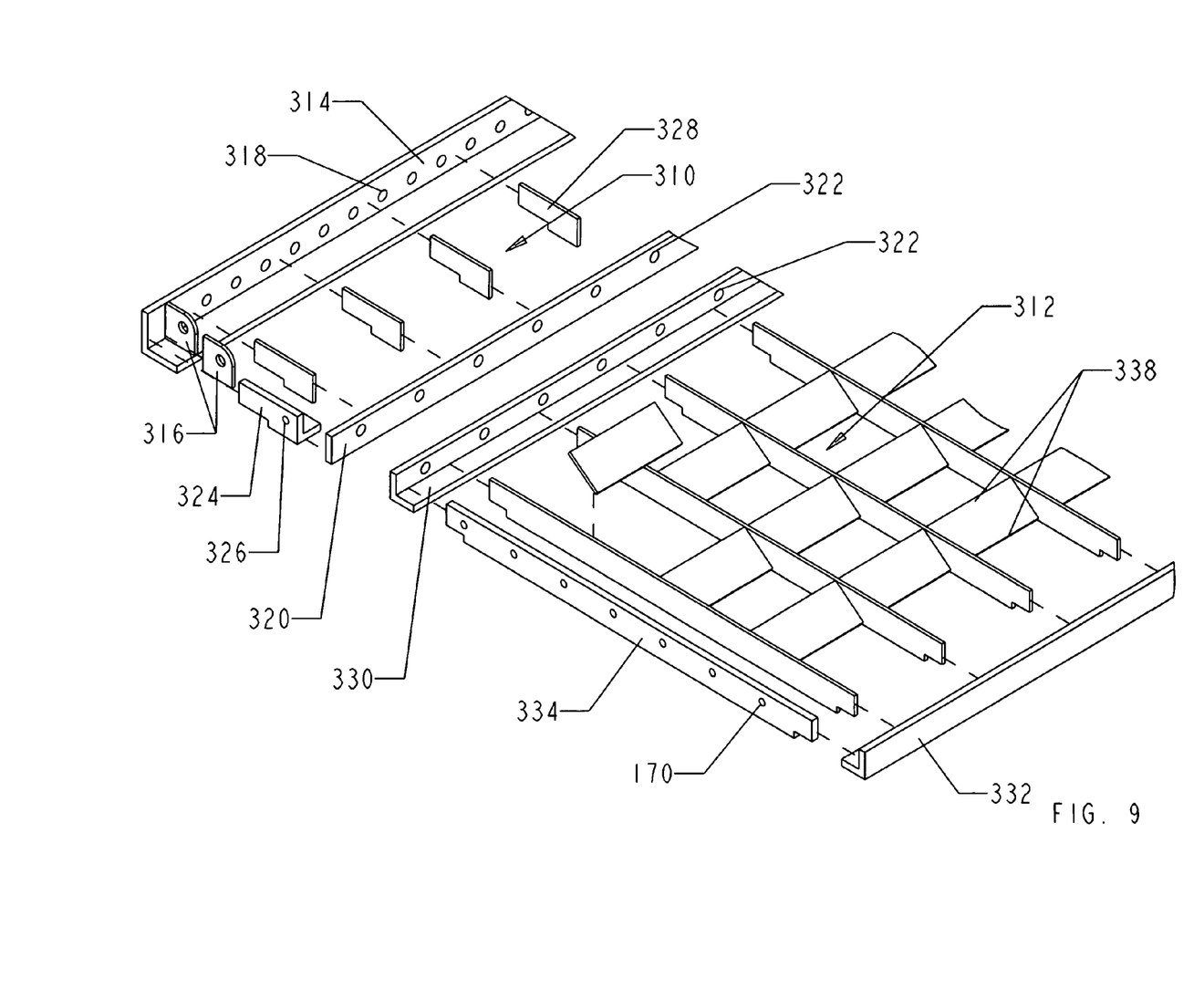
FIG. 9 is an enlarged fragmentary view of "DETAIL C" depicted in FIG. 8.

First grille section 310 comprises a frontal L-section beam 314 provided at each end with a pair of hinge brackets 316 having coincidental eyelets. Frontal L-section beam 314 is traversed along its length by a series of bolt-holes 318.

A strip 320 is placed oppositely frontal L-section beam 314 and spaced at a relatively small distance from the latter. The former is traversed along its length by a plurality of bolt-openings 322. Frontal L-section beam 314 and strip 320 are rigidly secured together, at their ends, in order to form a rectangular frame, by a pair of L- section segments 324.

Each L-section segment 324 has a cut-out for adjusting to frontal L-section beam and also a lateral perforation 326. A plurality of vertical spacers 328 is placed at equal intervals between frontal L-section beam 314 and strip 320.

Second grille section 312, as viewed in plan, has also a rectangular shape and includes an anterior L-section beam 330 and a posterior inversed L-section beam 332, the latter, positionally, constituting a mirror image of the former. Anterior L-section beam 330 is traversed along its length by a plurality of bolt-openings 332 coincidental with those of strip 320.

A pair of elongated flat plates 334, each provided at each end with a cut-out for engaging an adjacent leg at the extremities of anterior L-section beam 330 and posterior inversed L-section beam 332, is used. Each elongated flat plate 334 of the aforementioned pair is provided along its length with a plurality of equally spaced apertures 170, similar with those used in the pair of lateral trusses 110.

Several elongated flat plates 334', distinguishable from the pair of elongated flat plates 334 only by the fact that the plurality of equally spaced apertures 170 is missing, are placed parallel to the pair of elongated flat plates 334 and equally spaced among themselves. Several sloping boards 336, located in the same plan with the several elongated flat plates 334', are perpendicularly disposed relatively to the later, and form together a series of chutes 338.

Metal grid receptacle 304 is parallelepiped-shaped, made of grading screen, and open only in the front. It is obvious, that metal grid receptacle 304 can be changed for another screen having a different mesh size to suit specific species of the selfish to be harvested.

Figure 10:
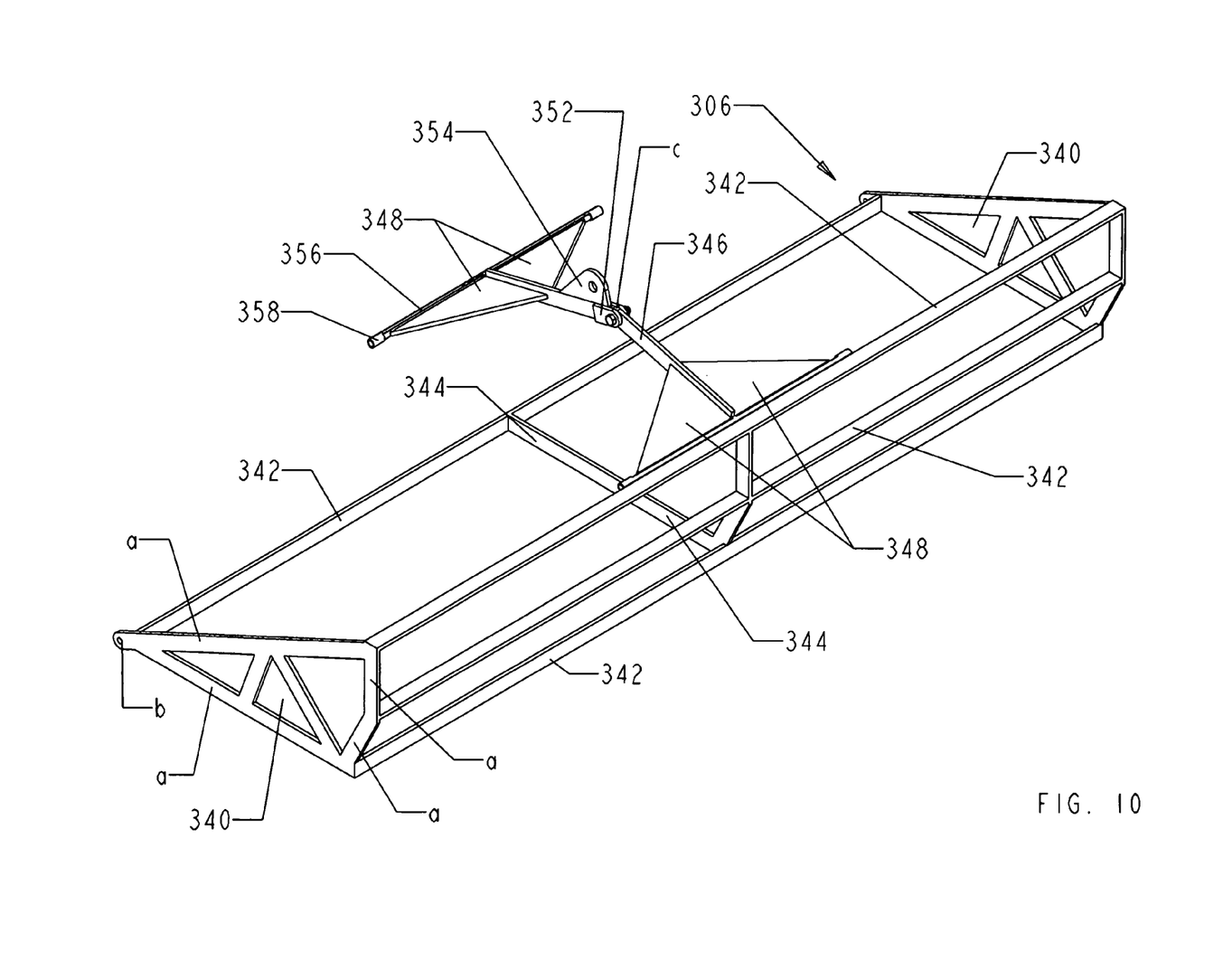
FIG. 10 is a perspective view of a mechanism for topple over a loaded metal grid receptacle.
Figure 11:
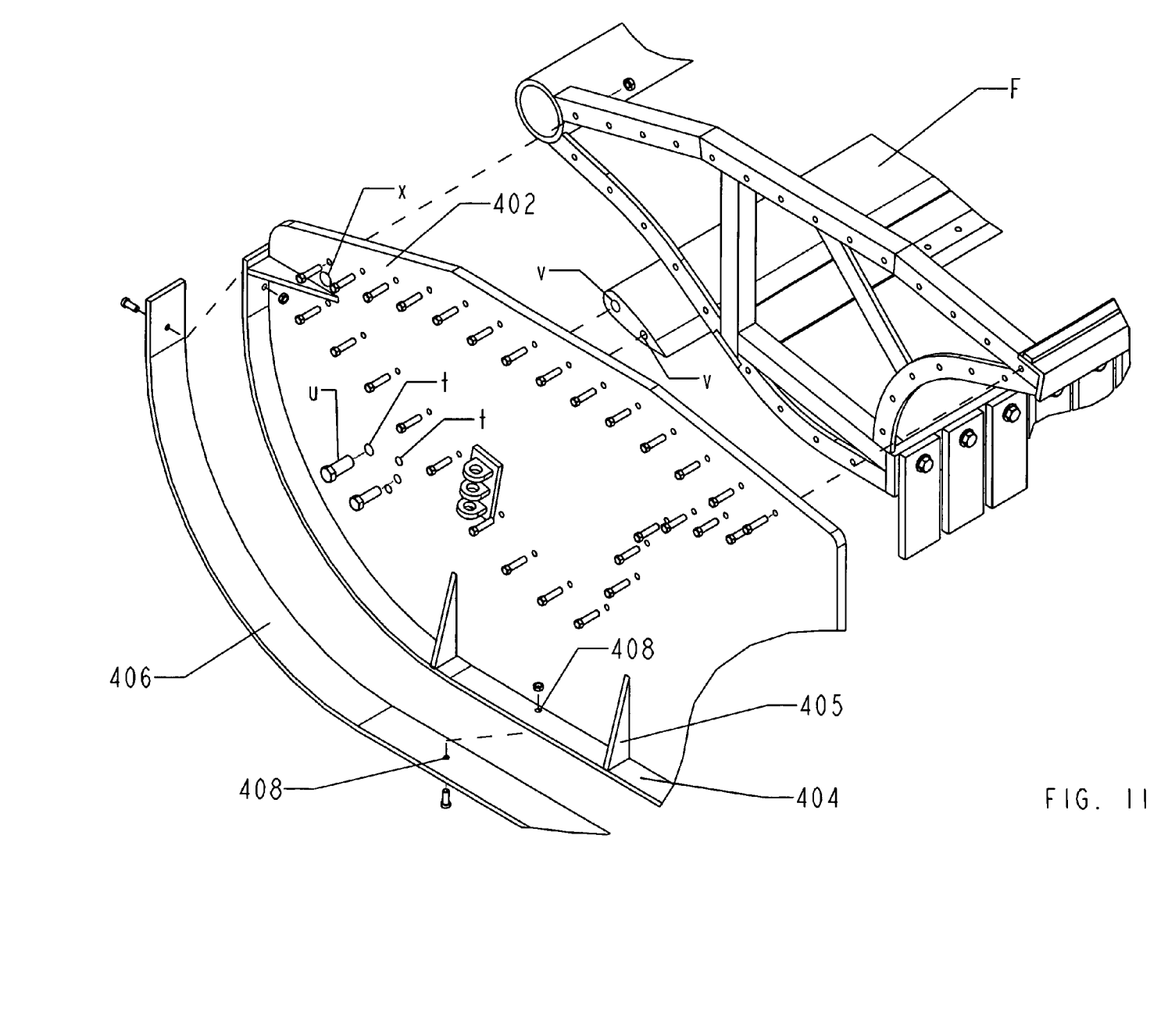
FIG. 11 is an enlarged fragmentary view of "DETAIL B" depicted in FIG. 2.

Mechanism for topple over 306 comprises a pair of polygonal structures 340, laterally and vertically located as to sidewise engage metal grid receptacle 304. Each polygonal structure 340 has four sides a. A pair of sides a converge and intersect frontally forming an acute angle, an opposed pair of sides a define an obtuse angle, while the remaining angles are right angles. Each zone of convergence of a pair of sides a corresponding to the acute angle is provided with a hole b. Four transversal elongated bars 342 connect between them the pair polygonal structures 340, namely between each intersection of a pair of sides a.

Starting from a bottom of each polygonal structure 340, three rigidity bars 344 are used to secure, at their midway, two successive transversal elongated bars 342. Transversal elongate bar 342, adjacent hole b is somewhat backwards retracted from an apex of the intersection of the corresponding pair of sides a. Rigidity bar 344 that is located at the bottom of polygonal structure will always be placed beneath metal grid receptacle 304 A first tilt lever 346, disposed in a vertical plan and inclined with respect to a horizontal plan, is attached at the middle of an upper transversal elongated bar 342. To enhance the reliability of the attachment of the former with respect to the latter from both sides, a pair of side reinforcing gussets 348 is used. First tilt lever 346 is provided, at its front side, with an opening c. A second tilt lever 350, forwards directed, follows first tilt lever 346. Second tilt lever 350 includes at its back end a double-bracket hinge 352 traversed by an opening c. Double-bracket hinge 352 receives front side of first tilt lever 346 and a conventional pin is used to articulate first and second tilt levers 346 and 350. A hooking bracket 354 used for lifting is secured at the upper back end of second tilt lever 350. A rod 356 is perpendicularly attached at that end of second tilt lever 350 that is opposite located with respect to double-bracket hinge 352. Each end of rod 356 is, by insertion, lodged as a bearing journal into a sleeve 358. Both sleeves are secured to inversed L-beam 165 incorporated in frame-enclosure truss subassembly 100. To enhance the reliability of an attachment of a front end of second tilt lever 350 to rod 356, a pair of side reinforcing gussets 348 is used.

Second set of a multiplicity of hinged flexible flaps, see reference number 308, is formed as a succession of longitudinally overlapping flaps that extend downwardly closer to the seabed (in comparison with first set of a multiplicity of hinged flexible flaps 180). A front strap 360 provided with a series of holes coincidental with the series of bolt-holes 318 of frontal L-section beam 314 and a corresponding multiplicity of conventional fasteners, such as bolts 185 inserted into equally spaced bolt-holes 318 and tightened by nuts 190. Third set of a multiplicity of hinged flexible flaps (an optional set intended for large rocky bottoms), see reference number 309, is inserted into gap G formed between strip 320 of first grille section 310 and anterior L-section beam 330 of second grille section 312. Since anterior L-section beam 330 is traversed along its length by a plurality of bolt-openings 332 coincidental with those of strip 320, for attaching the multiplicity of hinged flexible flaps, use is made of bolts 185 and nuts 190 as in previous flaps attachments. Third set of a multiplicity of hinged flexible flaps 309 is relatively shorter than first set of a multiplicity of hinged flexible flaps 180.

External subassembly 400 for encasing frame-enclosure truss subassembly 100 together with internal subassembly 200, and, as well, subassembly 300 for collecting and discharging harvested shellfish, comprises:

A pair of vertical, sturdy, lateral walls 402 extending longitudinally for flanking encasing frame-enclosure truss subassembly 100 and the other subassembly attached to it. A foil F is also flanked by the pair of vertical, sturdy, lateral walls 402, being located transversally to the latter, and generally, corresponding to a center of a cavity formed in the front of internal subassembly 200.

At its uppermost part, each vertical, sturdy, lateral wall 402 is defined by an upper periphery, which, basically, reproduce a continuous corresponding successively to a top of inclined upper truss member 115 starting from tubular member 105, to a top of intermediary upper truss member, to a a top of upper end truss member 125, and, then, after abruptly descending, to a top of L-section segment 324 and, finally, to a top of elongated flat plate 334.

A lower contour of each vertical, sturdy, lateral wall 402 starts from tubular member 105 and continues with a curvilinear descent that forms, as seen from outside, a convex shape, to change into a horizontal line extending up to an end of assembly 10.

A sole 404, made from a flat bar, is secured to a bottom of and outwardly from each vertical, sturdy, lateral wall 402, namely through the length of its lower contour. Several spaced stiffeners 405 are used to enhance a reliability of the joint between each vertical, sturdy, lateral wall 402 and sole 404. A runner 406 having a profile reproducing sole 404 is removably attachable to the latter. Sole 404 and runner 406 are each provided with coinciding openings 408 which via bolt-nut connections 410 allow their attachment. There is a distance between a lowest point of anterior, curved panel 205 of internal subassembly 200 and a bottom of each runner 406 which touches the submarine surface. In a space created by that distance extend downwardly first, second and third sets of multiple hinged, flexible flaps, respectively 180, 308 and 309.

A unit of several eyelet hooks 412 for dragging and lifting is firmly secured laterally to an external surface of each vertical, sturdy, lateral wall 402.

Each of the latter is traversed by a number of perforations as follows:

perforation s for lateral truss 110 attachment; perforations s being coaxial with the plurality of equally spaced apertures 170 drilled into inclined upper truss member 115, intermediary upper truss member 120, upper end truss member 125, lower truss member 130, connecting truss member 145, and elongated flat plate 334; a perforation s is also compatible with lateral perforation 326 in L-section 324;

perforations t for locating and positionally adjusting foil F; one perforation t for locating foil F and three perforations t spaced backwards and disposed on an arc of a circle; and a pair of screws u for passing through two of the foregoing four apertures t and for tightening in threaded blind holes v provided at each lateral extremity of foil F; and a discharge perforation x for air escape from a space in front of anterior, curved panel 205.

An inclined top panel 414 starting from tubular member 105 extends backwards along and over a pair of inclined upper truss member 115. Inclined top panel 414 is secured to the pair of inclined upper truss members 115. An intermediary top panel 416 starting from a back end of inclined top panel 414 extends also backwards along and over a pair of intermediary upper truss members 120. Intermediary top panel 416 is secured to the pair of intermediary upper truss members 120.

Figure 12:
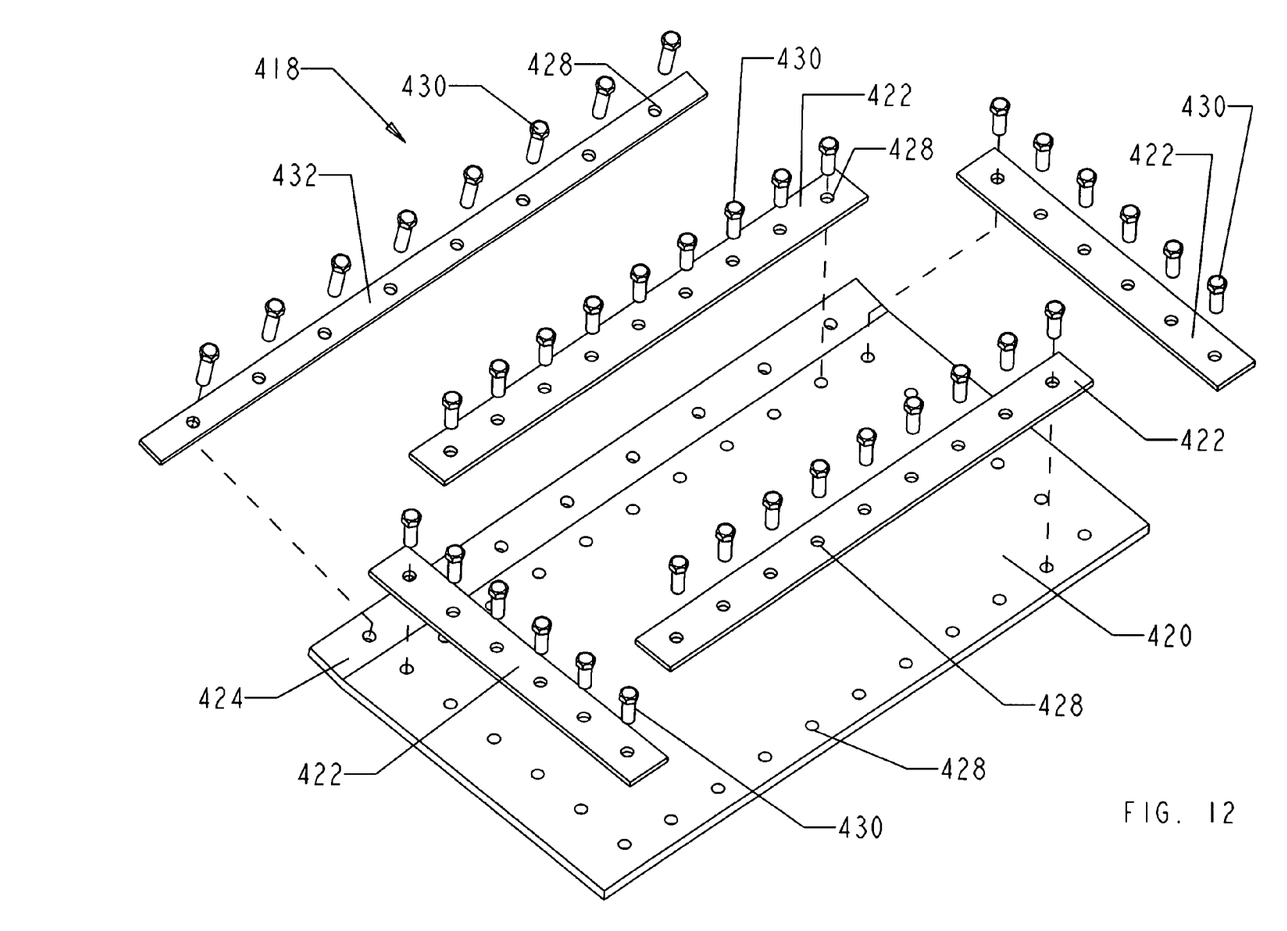
FIG. 12 is an exploded view of a flat panel.

A flap panel 418 (set of 4) starting from an end of inclined top panel 414 extends, in general, backwards, along and over a pair of upper end truss members 125. Flap panel 418 has a rectangular shape and includes a plate 420 reinforced along its sides by straps 422. A front transversal edge 424 of plate 420 extends forwards beyond its adjacent strap 422 to lay on a L-section deformable beam 426 secured at a beginning of the pair of upper end truss members 125. Plate 420 and straps 422 are provided with corresponding orifices 428 and bolt-screw combinations 430 for joining together.

An extra strap 432 is superimposed on front transversal edge 424. The former and the latter are also provided with corresponding orifices 428 and bolt-screw combinations 430 for joining together.

A deformable strap 432 is attached on top of inversed L-beam 165 and is intended to alleviate impacts from an opposed posterior part of flap panel 418 when the latter is brusquely closing.

OPERATION

The present assembly 10 is attached by a cable to a floating vessel and dragged over the sea bottom. A hoisting mechanism (not shown), operating the cable, is attached to the floating vessel and is used to lower assembly 10 on the sea bottom before any dragging operation starts and to lift assembly 10 out of the water at an end of each harvesting operation. The unit of several eyelet hooks 412 for dragging and lifting is firmly secured laterally to an external surface of each vertical, sturdy, lateral wall 402 and is attachable by cable to the hoisting mechanism atached to the floating vessel.

Foil F, whose structure and attachment were disclosed before, provides a surface designated to maximize a force generated perpendicular to the water flow, i.e. a "lift", while minimizing the resistance under the water due to a friction of runners with the sea bed, i.e. a "drag". Foil F is provided with means for adjusting its attack angle by tilting in a fixed position. An explanation of the foil use is that the water flowing over foil F achieves a higher velocity and a corresponding lower pressure than the water flowing under foil F resulting in an upward force/lift/; however, due this pressure differential, the water near foil F tip tends to flow from beneath foil F to above the latter. This "leakage" around the tip forms foil tip vortices. When the upper and lower water flows meet at the trailing edge of foil F numerous little vortices are formed and, then, unite to form a large vortex (at the tip of foil F).

Figure 13:
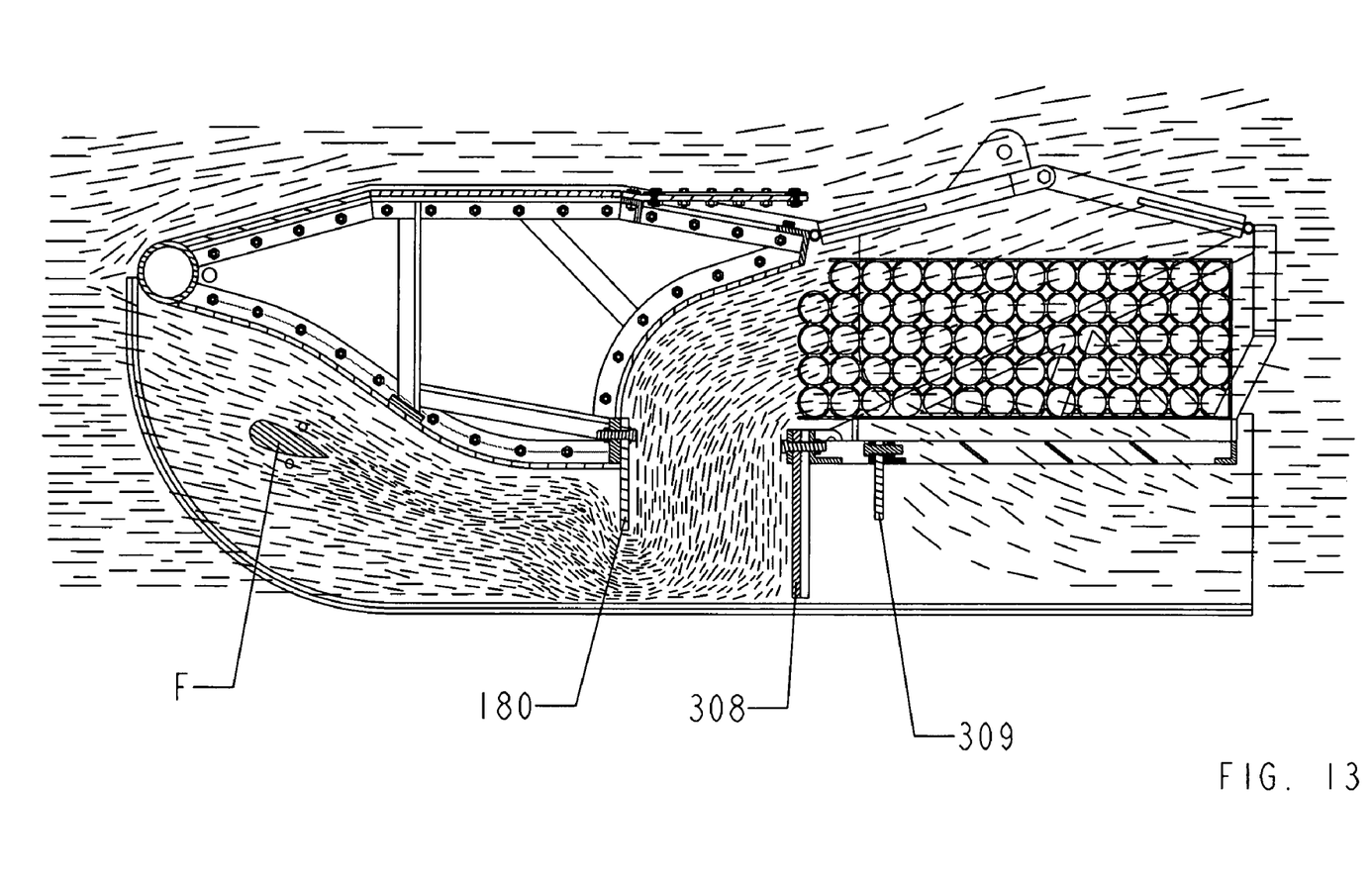
FIG. 13 is a longitudinal cross section as shown in FIG. 5, wherein the flow of water and shellfish is diagrammatically shown.

This large vortex creates a spiral motion of water within a limited area, namely a whirling mass of water that sucks everything near it towards its center. Here intervenes internal subassembly 200 with its anterior, curved panel 205 followed by posterior, curved panel 210. Thus, water containing shellfish is carried away and then directed into metal grid receptacle 304 via its open front. Now the water can flow out of metal grid receptacle 304, while shellfish is captured therein.

What I claim is:

1. An assembly for harvesting shellfish such as scallops and alike comprising a frame-enclosure truss subassembly to which are attached internal means for directing a flow of encountered water during a dragging operation of said assembly for harvesting shellfish;

means for collecting and discharging harvested shellfish; and external means for encasing said frame-enclosure truss subassembly together with said internal means for directing a flow of encounter water during dragging;

said frame-enclosure truss subassembly including a pair of lateral trusses extending longitudinally and spaced at a distance commensurable with a working width of said assembly for harvesting shellfish;

said internal means for directing a flow of encountered water during a dragging operation including an anterior, curved panel having its concavity forwards oriented and a posterior, curved panel having its concavity backwards oriented, said anterior and posterior curved panels being flanked by said pair of lateral trusses;

said means for collecting and discharging harvested shellfish, disposed behind said internal means for directing a flow of encountered water during a dragging operation, including a louver type grille-platform, a metal grid receptacle supported by said louver type grille-platform and a mechanism for topple over said metal grid receptacle when loaded with shellfish; and at least a pair of sets of a multiplicity of hinged flexible flaps being used, a first, front one being attached to a lowest part of said internal means for directing a flow of encountered water during a dragging operation, where said anterior and posterior curved panels meet, while a second multiplicity of hinged flexible flaps being attached at a frontal part of louver type grille-platform.

* * * * *